March 28, 1967    J. A. STEIN ETAL    3,311,732
INDUCTION HEATING MEANS

Original Filed Oct. 27, 1961    8 Sheets-Sheet 1

FIG. 1

INVENTORS
JOHN A. STEIN
BY   THERIAN E. AUSTIN

ATTORNEY

March 28, 1967  J. A. STEIN ETAL  3,311,732
INDUCTION HEATING MEANS
Original Filed Oct. 27, 1961  8 Sheets-Sheet 2

INVENTORS
JOHN A. STEIN
THERIAN E. AUSTIN
BY
ATTORNEY

INVENTORS
JOHN A. STEIN
THERIAN E. AUSTIN
BY
ATTORNEY

FIG. 6

March 28, 1967 J. A. STEIN ETAL 3,311,732
INDUCTION HEATING MEANS
Original Filed Oct. 27, 1961 8 Sheets-Sheet 5

INVENTORS
JOHN A. STEIN
THERIAN E. AUSTIN
BY
ATTORNEY

March 28, 1967   J. A. STEIN ETAL   3,311,732
INDUCTION HEATING MEANS
Original Filed Oct. 27, 1961   8 Sheets-Sheet 6

INVENTORS
JOHN A. STEIN
BY THERIAN E. AUSTIN

ATTORNEY

March 28, 1967  J. A. STEIN ETAL  3,311,732
INDUCTION HEATING MEANS
Original Filed Oct. 27, 1961  8 Sheets-Sheet 7

*INVENTORS*
JOHN A. STEIN
THERIAN E. AUSTIN
BY

ATTORNEY

March 28, 1967 J. A. STEIN ETAL 3,311,732
INDUCTION HEATING MEANS
Original Filed Oct. 27, 1961 8 Sheets-Sheet 8

FIG. 16

INVENTORS
JOHN A. STEIN
THERIAN E. AUSTIN
BY
ATTORNEY 3,311,732
INDUCTION HEATING MEANS
John A. Stein, Torrance, and Therian E. Austin, Long Beach, Calif., assignors to North American Aviation, Inc.
Original application Oct. 27, 1961, Ser. No. 148,171, now Patent No. 3,156,807, dated Nov. 19, 1964. Divided and this application Apr. 20, 1964, Ser. No. 366,941
17 Claims. (Cl. 219—10.49)

This is a divisional application of copending parent application Ser. No. 148,171, filed Oct. 27, 1961, now U.S. Patent 3,156,807, issued Nov. 19, 1964.

This invention relates to method and means for applying heat to a workpiece as required for various manufacturing or repairing operations thereon, including localized heat treatment of parts, and the formation of brazed conduit joints and connections. More particularly, the invention contemplates improved method and means for applying heat in precise predetermined amounts for accurately controlled periods of time to workpieces such as required for in-place brazing of steel tubing in crowded installations.

Although the invention is of wide applicability in forming a variety of diverse joints or connections between elements of different forms and materials for various purposes, it will be described for the sake of illustration in connection with high strength tubes or conduits used in aircraft and high speed aerial or space vehicles. It will be understood that the scope of the inventive concept is in no sense limited by any of the specific details used to explain the invention, except as determined by reference to the accompanying claims.

Modern aircraft and aerial vehicles, whether manned or not, are characterized by a high degree of complexity which, combined with the need for efficient use of all available space, results in extremely crowded internal conditions. Tubes and conduits such as required for hydraulic lines or other systems in the stated environment are usually formed in separate sections of various shapes as required to route them through compartments and bulkheads. The abutting ends of adjacent conduit sections must be aligned and secured to each other by means which will maintain the continuity of flow within the conduit or tube and prevent leakage at the joint formed between the sections. The stated joints are required to be of great strength inasmuch as fluid conduits in vehicles of the stated type are normally affixed to the vehicle frame and are therefore affected both by vibrations and by deflections in the frame such as would tend to loosen, distort or otherwise adversely affect the alignment of the separate conduit sections, the structure used to maintain such alignment, or leakage properties of the joints. Deflections of the fuselage and wing structure in vehicles of the type mentioned above are frequently encountered due to aerodynamic and inertia loads imposed on the vehicles during their operation.

The choice of method and means for securing adjacent conduit or tube sections of the stated type is further influenced by the need for minimum size and weight of structural components for use in ultra-high speed aerial and space vehicles. Moreover, flow systems involving extreme fluid temperature and stress conditions such as 4000 p.s.i. and 500° F. require use of materials of construction formerly unknown in the fabrication of conventional supersonic aircraft. Notable among such materials are the so-called advanced alloys of precipitation hardenable stainless steel, of which the alloy designated as 350 stainless steel is illustrative. The component elements and general range of percentage composition by weight for 350 stainless steel is as follows:

|  | Percent |
| --- | --- |
| Carbon | 0.08– 0.12 |
| Manganese | 0.75– 1.25 |
| Silicon | [1] 0.50 |
| Phosphorous | [1] 0.04 |
| Sulfur | [1] 0.03 |
| Chromium | 16.00–17.00 |
| Nickel | 0.00– 5.00 |
| Molybdenum | 2.50– 3.25 |
| Nitrogen | 0.07– 0.13 |

[1] Maximum.

While the stated precipitation hardenable alloys including 350 stainless steel provide great strength at extreme environmental temperatures when used in fluid conduits or tubing, such materials are characterized by a reduction in strength when heated excessively. Thus, for example, during a brazing operation to join workpiece materials of precipitation hardenable stainless steel in the hardened condition, the application of heat in an amount sufficient to melt the brazing alloy may cause annealing and consequent weakening of the conduit material in the absence of measures to control the intensity, the duration, and the area of application of such heat.

In connection with the particular sensitivity of precipitation hardenable stainless steels to the application of brazing heat, new brazing alloys have been recently developed for use in the problem situation discussed herein, in order to minimize the amount and duration of brazing heat. Moreover, resort to improved power supply connections has been necessary because conventional power sources and connections lack the ability to create sufficient heat for induction brazing involving the materials and alloys discussed above at locations relatively distance from the power source, as required for in-place brazing.

Accordingly, it is a principal object of this invention to provide improved connection method and means for securing adjacent separate sections of tubular conduits or the like to each other at the adjoining ends thereof.

It is a further object of this invention to provide improved connection method and means as set forth in these objects suitable for use in an environment characterized by high pressure, high temperature, and vibration of diverse frequencies and amplitudes for prolonged periods.

It is a further object of this invention to provide an improved conduit connection as set forth in these objects characterized by superior strength and perforance reliability.

It is another object in this case to provide a conduit connection as set forth in these objects which is capable of installation in crowded equipment areas providing severely limited working space around the stated connection.

It is also an object of this invention to provide conduit connection method and means as set forth in these objects characterized by accurate and automatic temperature controls.

It is an additional object in the instant case to provide induction heating means for brazing a connection as set forth in the above objects when such connection is situated at great distances from the power source for causing such heating.

Other objects and advantages of the instant invention will become apparent upon a close reading of the following detailed description of an illustrative embodiment of the invention, reference being had to the accompanying drawings, wherein:

FIGURE 7 is a side elevational view of the induction coils forming part of the brazing fixture shown by FIGURES 1-6, inclusive, FIGURE 8 shows a cross-sectional view taken on a vertical plane through the center of the structure shown by FIGURE 7, including in addition thereto, a fragmentary view of a cable end adapted for connection with the stated coil, while FIGURE 8a is a variation in certain details of FIGURE 8, FIGURE 9 is a fragmentary view showing details of the separable connection means between upper and lower portions of the spread induction coil of FIGURES 7 and 8.

Figure 1:
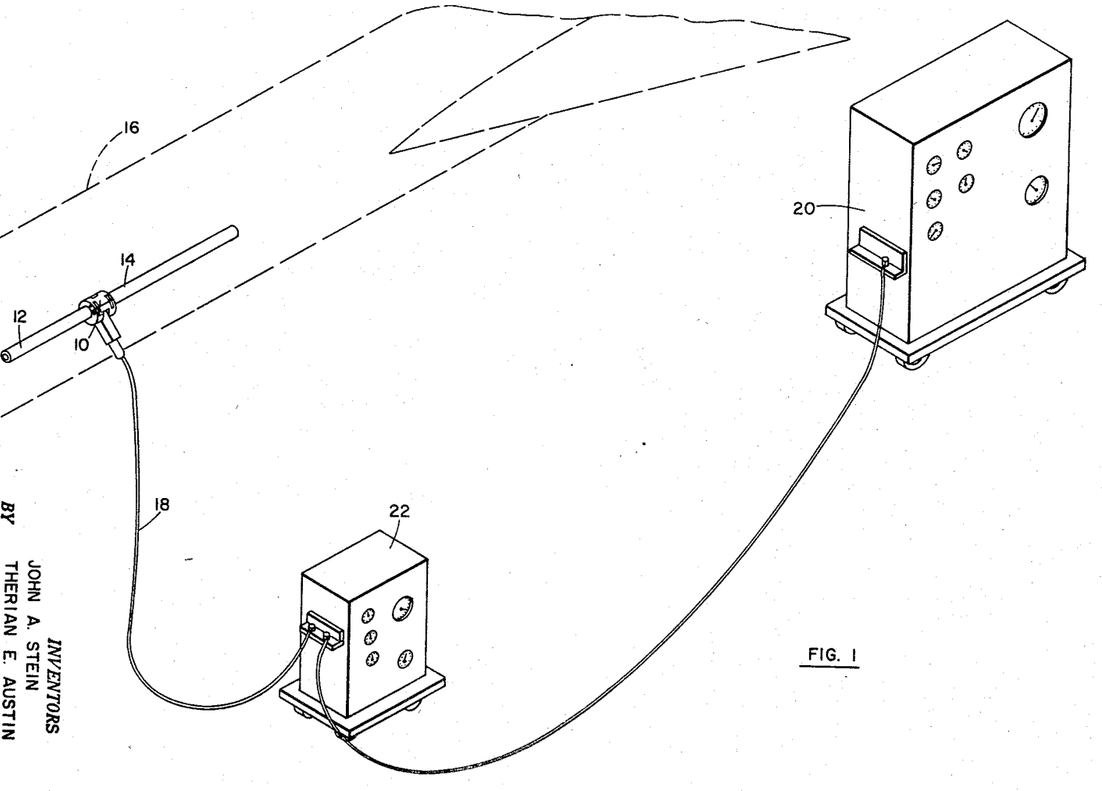
FIGURE 1 shows a general perspective overall view of system components adapted to accomplish in-place brazing in an aerial vehicle according to the inventive principles disclosed herein.

With reference to the drawings described above, and particularly to FIGURE 1, the invention disclosed herein may be seen to include a brazing fixture generally designated by reference numeral 10 shown operatively positioned to form a joint or connection between two adjacent structural elements in the form of metallic conduit sections 12 and 14 within a missile or aerial vehicle 16. Although the structure surrounding conduit sections 12 and 14 is not shown in FIGURE 1, it will be understood that the total volume within vehicle 16 may be characterized by extremely crowded conditions which severely limit the working space available. Accordingly, brazing fixture 10 is preferably of small and compact nature, and is adapted to receive all of its operating requirements through cable means 18 whereby the power generator or transformer means for furnishing such requirements may be situated remotely from the precise locations at which brazing is accomplished by fixture 10. Such remote location of a brazing fixture relative to its power source is not necessary in the case of bench brazing where no problem of limited access normally exists. Since power generator 20 and transformer 22 are standard commercially available items for supplying electrical impulses at diverse amplitudes and frequencies as required for welding or brazing operations, the details thereof need not be shown in the instant case and form no part of the concept herein.

Figure 2:
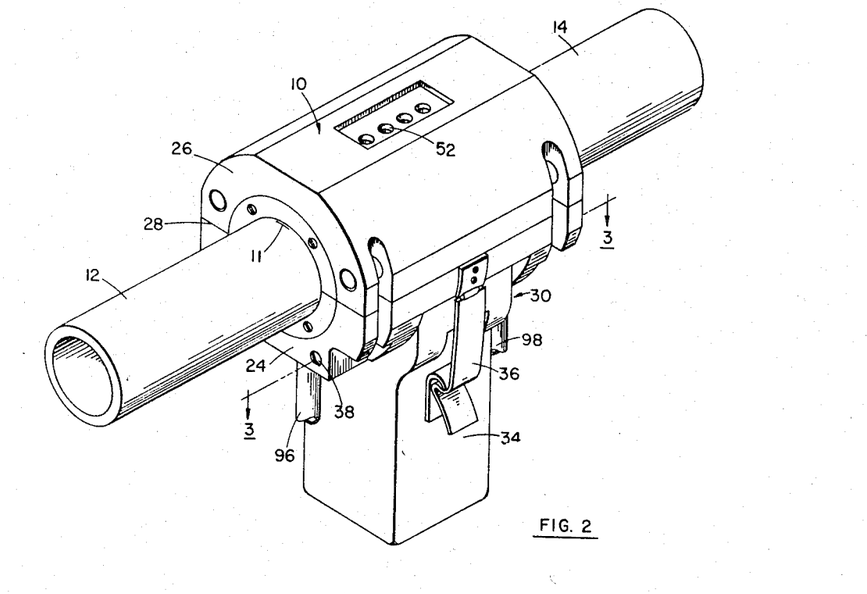
FIGURE 2 is an isolated perspective view of the brazing fixture shown by FIGURE 1 on a larger scale.
Figure 6:
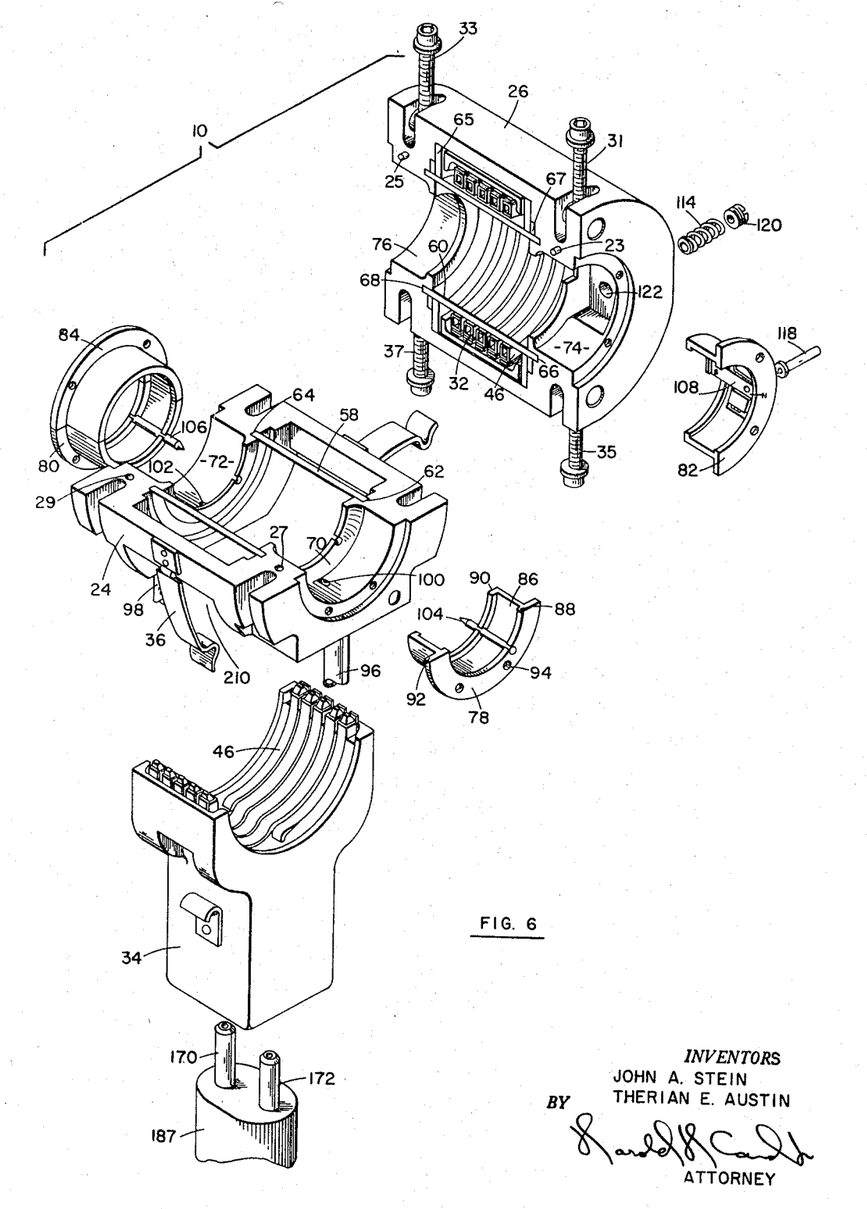
FIGURE 6 is an exploded view in perspective of the brazing fixture shown by FIGURES 1-5, inclusive.

As shown in greater detail by FIGURE 2, brazing fixture 10 comprises in general an annular housing divided into two separable portions 24 and 26 which contact each other on a plane of separation 28. Two aligning stakes or pins 23 and 25 on portion 26 enter holes 27 and 29 in portion 24 to insure correct positioning of the two stated housing portions in operative relationship, while holding means in the form of threaded studs 31, 33, 35 and 37 apply tension between portions 24 and 26 to maintain the stated relationship as shown by FIGURE 6. Brazing fixture 10 further comprises induction heating means in the form of coil element 30 comprising separable portions 32 and 34 of dielectric material as shown more particularly by FIGURE 7. Clamping means such as shown by reference numeral 36 in FIGURE 2 situated on either side of annular housing portion 24 serve to retain coil element 30 in operative relationship with annular housing portions 24 and 26.

Figure 3:
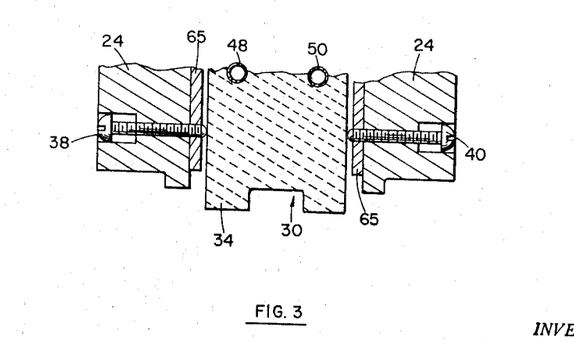
FIGURE 3 is a fragmentary view in cross-section taken along line 3—3 of FIGURE 2, with portions of structure omitted for the sake of clarity.

Position adjusting means for altering the relative position between coil element 30 and annular housing portion 24 are provided in brazing fixture 10 in the form of two adjusting screws 38 and 40 as shown by FIGURE 3. Thus, the position of coil element 30 within annular housing portion 24 may be varied with respect to the same in a direction coinciding with the longitudinal axis of conduit sections 12 and 14 by rotation of adjusting screws 38 and 40, the distal ends of which bear against opposite sides of the coil element.

Figure 4:
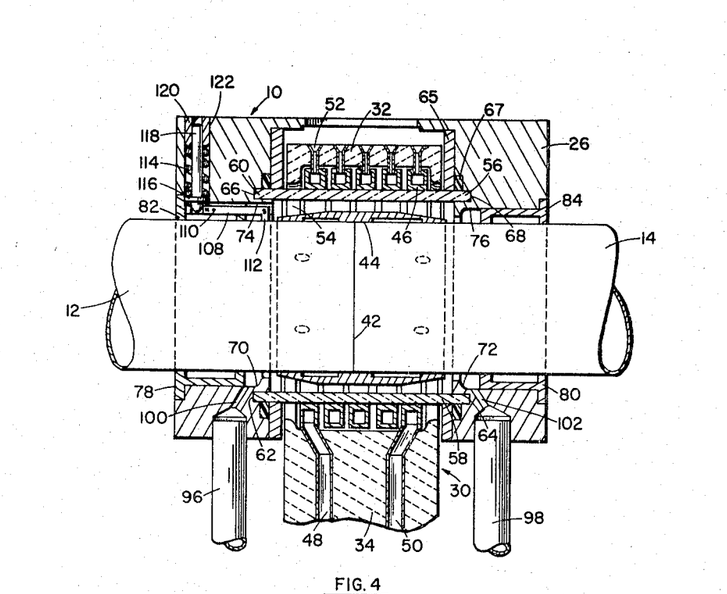
FIGURE 4 is a cross-sectional view taken on a vertical plane through the center of the brazing fixture shown by FIGURES 1 and 2.

The operative relationship between brazing fixture 10 and the workpiece components upon which the brazing operation is accomplished may be seen from FIGURE 4 which shows adjacent conduit sections 12 and 14 in substantial axial alignment with their ends contacting in a plane of abutment 42 centrally located within a brazing sleeve or bushing 44 about which brazing fixture 10 is secured. FIXTURE 10 in essence combines induction heating means for heating the assembled workpiece components to braze the same, cooling means for cooling the induction heating means, purging means to provide an inert atmosphere around the brazing area, aligning means to insure proper relationship between fixture 10 and the assembled workpiece components, and temperature control means to limit the duration or amount of applied brazing heat. Each of the foregoing essential features of fixture 10 is operatively interrelated with the remaining features as discussed below in the foregoing order following which the novel power supply means for connecting fixture 10 to a remotely located power source is described.

Induction heating means as referred to above is provided in the form of one of more hollow rings 46 of electrically conductive materials embedded within a suitable high temperature resistant dielectric mass 32, 34, which, together with the stated ring or rings, comprises coil element 30. Rings 46, wether one or several, form in effect a single continuous hollow tube which begins at 48 as shown in FIGURE 4 and winds in spiral turns culminating in tube end 50 whereby a flow of current originating from a source connected at 48 may be transmitted through the tube walls and return to the stated source through 50. Cooling air outlet means in the form of apertures 52 are provided at a peripheral location on each ring 46 remote from the connection of rings 46 with portions 48 and 50 whereby cooling air introduced through 48 and 50 may flow through the hollow center of the tube and exit through the stated apertures.

Figures 7, 8, 8A, 9:
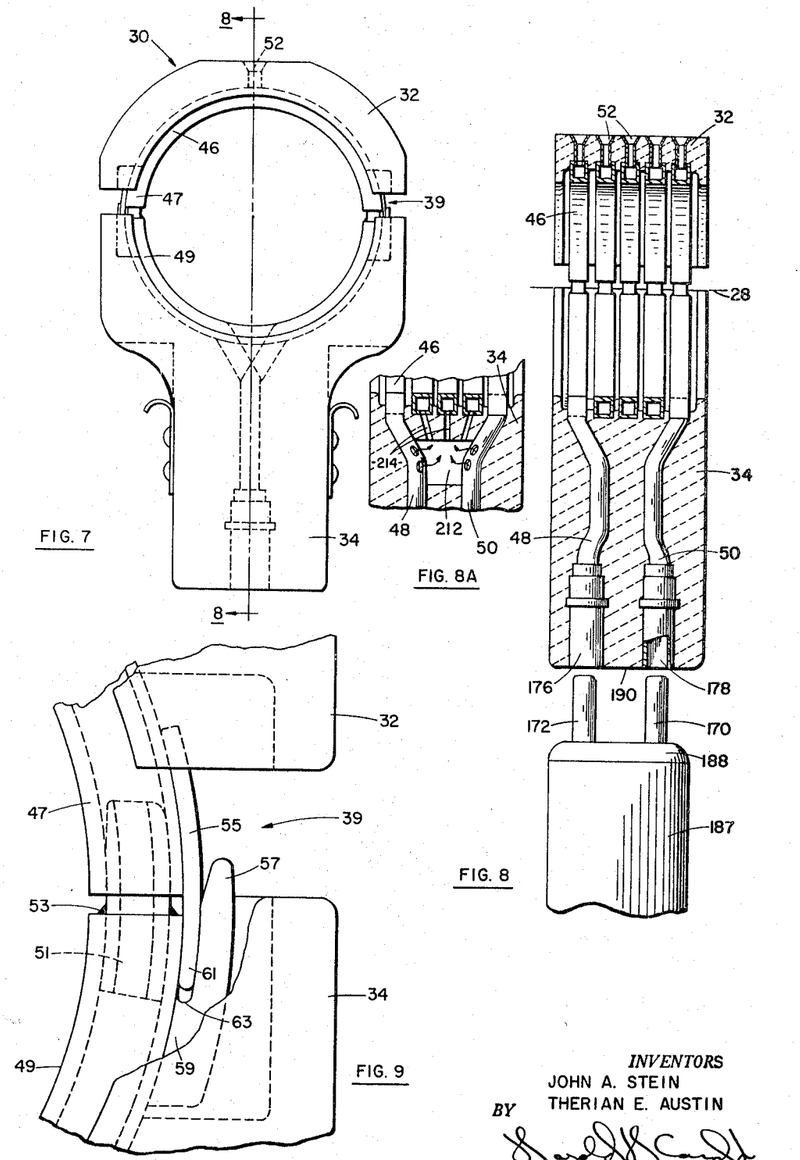

Due to the separable nature of coil 30 into two portions 32 and 34 as described above, rings 46 are formed by two portions 47 and 49 contacting each other on plane of separation 28. Coil coupling means generally designated by reference numeral 39 in FIGURE 7 are provided so that electrical and fluid flow continuity will result in the coil formed by rings 46 when portions 32 and 34 are assembled in operative relationship. Coupling means 39 is shown in greater detail in FIGURE 9 wherein it may be seen that upper ring portion 47 terminates in an aperture formed by the walls of ring 46 which may be generally of square configuration as seen, for example, by the sectional view therethrough in FIGURE 8. FIGURE 9 also shows bushing or sleeve means for insertion in the terminal aperture of ring portion 47, the stated means comprising hollow bushing member 51 which may be welded, brazed or otherwise secured within lower ring portion 49 as indicated at 53. In addition to electrical contact between upper and lower ring portions 47 and 49 through plug member 51, electrical continuity across coil coupling 39 is also insured by the provision of two cooperating blade electrodes 55 and 57 adapted to contact each other over a substantial portion of their confronting surface areas as seen in FIGURE 9. Thus, electrode 57 may be integrally formed or otherwise secured to lower ring portion 49 in the area indicated by reference numeral 59 whereby blade portion 57 is secured in spaced relationship from ring portion 49 as shown by FIGURE 9. Electrode 55 may be formed by a strip of metal secured to upper ring portion 47 whereby a downwardly depending portion 61 of electrode 55 is aligned and clamped within space or gap 63 formed by the spaced relationship of electrode 57 and lower ring portion 49 as described above.

Purging means, as mentioned above, are included in fixture 10 in the form of an annular chamber 54 defined in part by cylindrical wall 56 which may be fabricated from Pyrex glass or suitable ceramic material. Wall 56 comprises two arcuate portions 58 and 60 which contact each other on plane of separation 28. Portion 58 is mounted within annular housing portion 24 by means of arcuate grooves 62 and 64 at either end thereof. Arcuate portion 60 is mounted within annular housing portion 26 by means of arcuate grooves 66 and 68 at either end thereof, as shown, for example, by FIGURES 4 and 6. Additional grooves are provided as shown in FIGURES 4 and 6 to accommodate arcuate sealing means 65 and 67 which are high temperature resistant material having suitable sealing properties to prevent leakage of purging gas from chamber 54 at either end of arcuate portions 58 and 60. Moreover, member 65 aids in confining the electro-magnetic heating effects of coil element 30 to the general area of bushing 44.

Referring again to FIGURE 4, it may be seen that chamber 54 is further defined by inner surfaces 70 and 72 of annular housing portion 24, inner surfaces 74 and 76 of housing portion 26, and sealing or annular bearing means 78–84 at either end of chamber 54 which seal the same from the surrounding atmosphere. The stated annular bearing means comprises arcuate bearing members 78 and 80 mounted in housing portion 24, and arcuate bearing members 82 and 84 mounted in housing portion 26 whereby members 78 and 82 contact each other on the plane of separation 28 to form a seal at one end of chamber 54, and members 80 and 84 similarly contact each other at the other end of the stated chamber, as seen, for example, in FIGURES 4 and 6.

In further connection with the purging means as referred to above, arcuate bearing members 78, 80, 82 and 84 each comprise in essence a cylindrical midportion with flanges at each end as shown more particularly by FIGURE 6. Thus, for example, bearing member 78 comprises cylindrical portion 86 having inwardly directed flanges 88 and 90 at either end thereof, and outwardly directed flange 92 for attachment of bearing member 78 to housing portion 24 by appropriate means such as a plurality of screws (not shown) which may pass through one or more holes 94 spaced as necessary around flange 92. Inwardly directed flanges 88 and 90 on member 78 are adapted to bear against the outer surface of a workpiece component such as conduit section 12 as shown in FIGURE 4, for example. In a similar manner, contact of the inwardly directed flanges on the other bearing members 80, 82 and 84 with conduit sections 12 and 14 functionally cooperate to form sealing means at each end of chamber 54.

The purging means to which reference is made above further includes conduit means 96 and 98 connected to passage means 100 and 102, respectively, as shown in FIGURE 4, for example. A suitable inerting agent such as argon gas may be supplied to chamber 54 through conduit means 96 and passage 100, while passage 102 and conduit 98 may provide a path for exit flow of the purging agent.

Aligning means as mentioned above are included in fixture 10 to insure proper operative relationship between the fixture and assembled workpiece components upon which the brazing operation is performed. The stated aligning means may be seen from FIGURE 6, for example, to include pins 104 and 106 mounted on arcuate bearing members 78 and 80, respectively. With the stated bearing members affixed to housing portion 24, and the stated aligning pins immovably secured to members 78 and 80, it will be seen from FIGURE 5, for example, that contact of the distal end of each stated pin with the opposite ends of sleeve or bushing 44 will result in alignment of fixture 10 with respect to bushing 44 in precisely the same relationship each time that the fixture is employed to braze a bushing of the particular size adapted for use with a given fixture. In consequence of the alignment of fixture 10 by means of pins 104 and 106 as discussed above, it will be understood that alignment of coil element 30 with respect to bushing 44 automatically occurs by reason of the relationship between coil element 30 and fixture 10 as determined by rotational adjustment of screws 38 and 40 discussed above and shown in FIGURE 3.

Temperature control means as mentioned above are included in fixture 10 to limit the duration or amount of applied brazing heat and may be seen from FIGURE 4, for example, to include circuit interrupting means in the form of pivotally movable member 108 which is mounted on housing portion 26 of fixture 10 by pivot means at 110. In the embodiment shown by FIGURE 4, member 108 comprises a bar magnet having a bearing portion 112 at one pole thereof adapted to contact the surface of conduit section 12. At the end of member 108 opposite from bearing portion 112, means are provided for the application of force to the member tending to rotate it counterclockwise as seen in FIGURE 4. The stated force means may take the form of a resilient member such as spring 114 which bears against a flange 116 tending to move a spring guide 118 to which the flange is attached whereby downward force is transmitted from spring 114 to one end of member 108 which is contacted by the lower end of spring guide 118. The end of spring 114 opposite from that which contacts flange 116 bears against a threaded plug 120 operatively engaged within a hole 122 in closing portion 26 whereby rotation of plug 120 moves the same vertically to adjust the force of compression spring 114.

Figure 10:
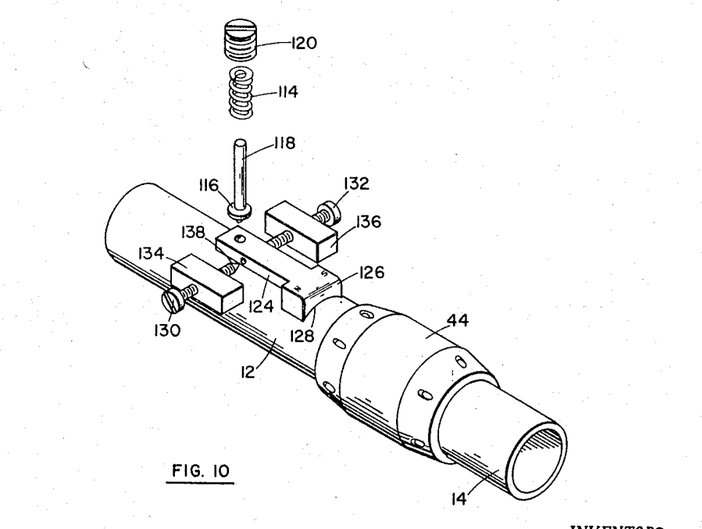
FIGURE 10 is an isolated view in perspective showing the general relationship between parts in a magnetic element for controlling duration of the application of brazing heat by the fixture shown in FIGURES 1 through 9, inclusive.

FIGURE 10 shows temperature control means constituting a slightly different modification of the structure discussed above in connection with FIGURE 4. Thus, it may be seen from FIGURE 10 that pivotally movable member 124 may be non-metallic, and is provided with a small magnet 126 having a surface 128 which may be of curved contour conforming to the surface shape of conduit section 12 and adapted to contact the same. Pivot means to permit rotational movement of member 124 within a limited range are provided in the form of threaded screws 130 and 132 operatively engaged within relatively stationary blocks 134 and 136, respectively, and provided with low-friction bearing points such as shown at 138 adapted to engage member 124 on either side thereof to provide a pivoting axis therefor. Force means for applying force tending to move magnet 126 away from contacting relationship with conduit section 12 are provided in the structure shown by FIGURE 10 in the form of spring 114 operatively related to member 124 in a manner similar to the relationship of spring 114 to member 108 discussed above in connection with FIGURE 4.

Figure 11:
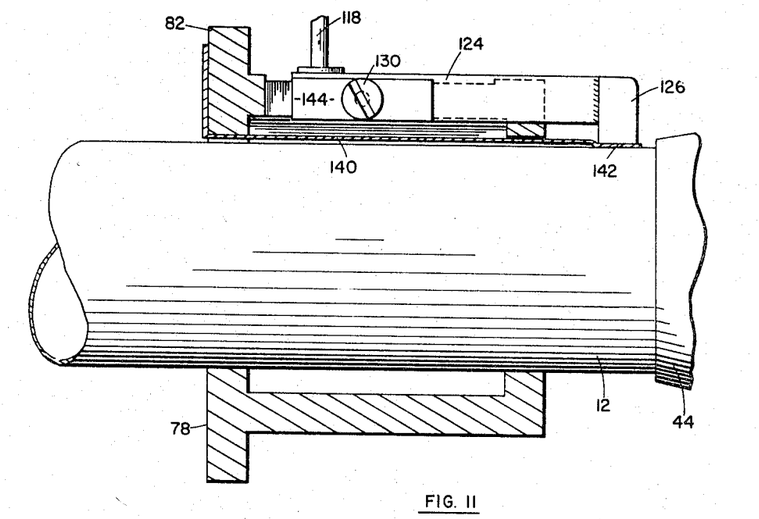
FIGURE 11 is a cross-sectional view through a portion of structure which may form part of the induction coil shown by FIGURES 1 through 9, inclusive, incorporating the temperature control means shown by FIGURE 10.

A further modification of the temperature control structure shown by FIGURES 4 and 10 and discussed above is shown in FIGURE 11. The stated modification is adapted for use with workpieces of non-magnetic materials wherein no attraction of the material results regardless of the intensity of a magnetic field to which the material may be exposed. A segment or strip of metal 140 is provided whereby magnet 126 on pivotally movable member 124 may be held in contact with strip 140 by magnetic force as shown in FIGURE 11. Strip 140 is secured to arcuate bearing member 82 in housing portion 26 by suitable means such as one or more screws (not shown) and is adapted to contact the surface of a workpiece element such as conduit section 12 at the distal end of strip 140 in a bearing portion or tab 142. Thus, tab 142 will normally be at or very nearly at the same temperature as conduit section 12 by reason of its close and continuous contact therewith. The remaining structure of the modification shown by FIGURE 11 may be precisely the same as that discussed above in connection with FIGURE 4 or 10. Thus, member 124 upon which magnet 126 is mounted may be pivotally supported between two bearing screws, one of which is indicated at 130, with force means including spring guide 118 applying force at one end of member 124 as shown in FIGURE 11.

Figure 12:
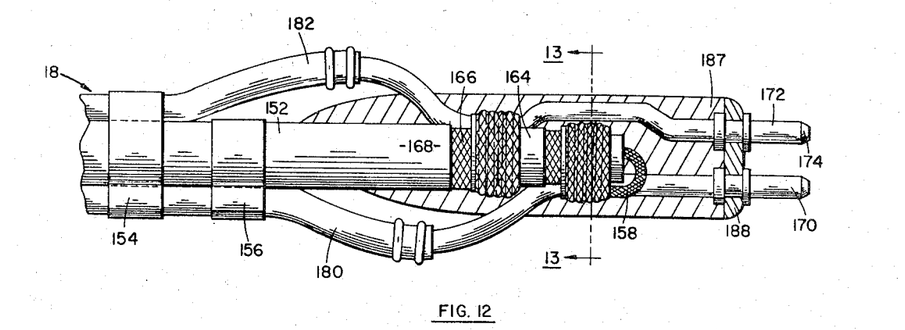
FIGURE 12 is a partial cross-sectional view of a power cable connector adapted for use with the brazing coil of FIGURES 7-9, inclusive.
Figures 13, 15:
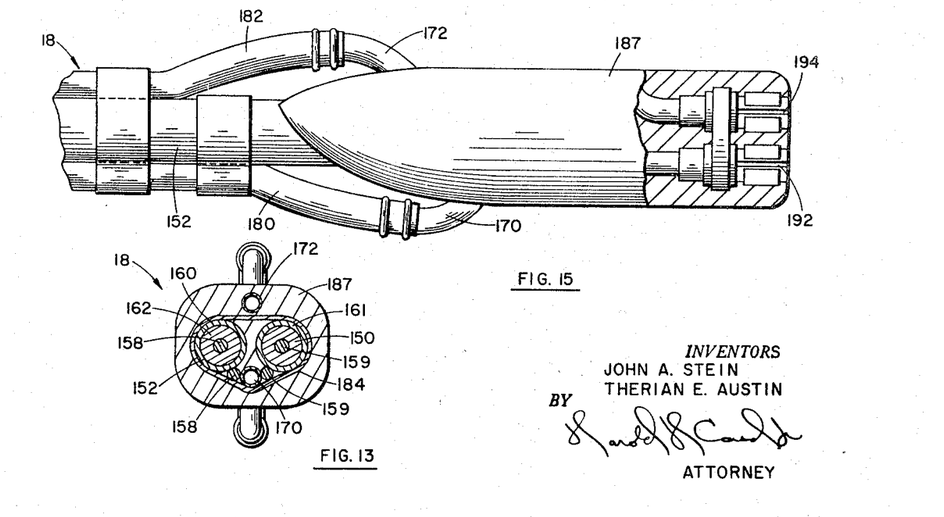
FIGURE 13 is a cross-sectional view taken along line 13—13 of FIGURE 12.
FIGURE 15 is an elevational view, partly in section, of a modification of the cable connector shown by FIGURES 12-14, inclusive.

Referring to FIGURES 12, 13, 14 and 15, means whereby power supply cables from units 20 and 22 may be connected to fixture 10 for brazing in remote locations is shown. The stated power connections include cables 150 and 152 which may be joined by suitable means such as clamps or tapes 154 and 156. Since cables 150 and 152 are identical, only one need be described. Thus, cable 150 as shown by FIGURE 13, for example, includes an inner conductor 158 at the center thereof, and an outer conductor 160 situated coaxially about conductor 158 and insulated therefrom by suitable dielectric material as shown at 162. Cables 150 and 152 further include an additional layer of insulating material as indicated at 164 in FIGURE 12 surrounding outer conductor 158 and separating the same from a metallic shield 166 coaxial with conductors 158 and 160. A suitable non-conducting and moisture-proof material is provided as an outer covering for cables 150 and 152 and is designated by reference numeral 168 in FIGURE 12. It will be understood by those skilled in the art that various other cable configurations, such as standard coaxial cable having only two conductors without a shield, might be used instead of cable 150 shown in FIGURE 13, for example. However, it is important to the inventive concept disclosed herein that the cables are not water cooled, since such cables are costly, heavy, relatively rigid and most unwieldy, hence not well suited for use with in-place brazing apparatus.

At the terminal end of cables 150 and 152 cooperatively related with brazing fixture 10, plug means are provided to adapt the stated cable ends for connection with fixture 10. The stated connection means include two hollow tubular conductors 170 and 172 as seen, for example, in FIGURES 12 and 14, the distal ends of which are sized and beveled as indicated at 174 to form two plugs for connection within two spaced holes 176 and 178 in coil element 30 adapted to receive the same. Hollow conductors 170 and 172 each function both as an electrical conductor and a fluid conduit. Thus, the end of each conductor opposite from the point of its connection with coil element 30 is connected to a hollow flexible conduit 180 and 182, respectively, whereby a cooling agent such as air or other fluid may be supplied to hollow coils 46 in coil element 30 through conduits 180, 182, conductors 170, 172 and passages 48 and 50 discussed above.

Figure 14:
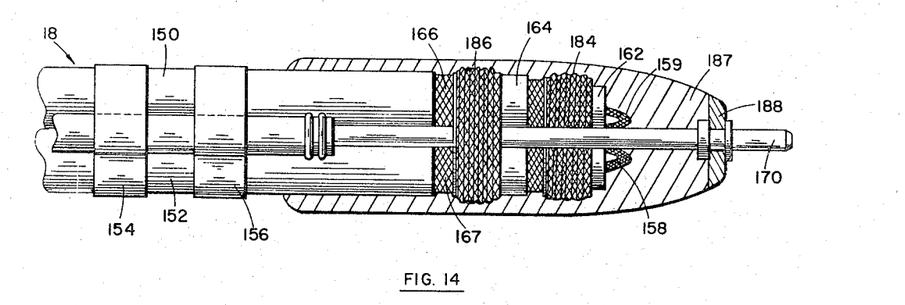
FIGURE 14 is a partial cross-sectional view of the cable connector of FIGURE 12 taken on a plane at right angles to the view shown by FIGURE 12.

It is of particular significance in the inventive concept disclosed herein that the cables connecting the power source with fixture 10 have very low resistance whereby the cable impedance matches the impedances of the brazing power generator-transformer combination. To this end, where cables of the type shown in FIGURES 12–14 are used, inner conductors 158 and 159 in cables 152 and 150, respectively, are positioned in close contact with conductor 170 and held against the same by an electrically conductive wrapping or clamp means 184 as shown in FIGURE 13. The same wrapping or clamp means 184 is also positioned in intimate electrical contact around outer conductors 160 and 161 in cables 152 and 150, respectively, and contacts conductor 170 as also seen from FIGURE 13. Metallic shield 166 and 167 on cables 150 and 152, respectively, are each firmly contacted by a separate conductive wrapping or clamp means 186 which also contacts hollow conductor 172 as shown by FIGURE 12. From the stated relationship of parts, it will be understood that cables 150 and 152 are connected in parallel with each other, and that conductors 158, 159, 160, and 161 are electrically joined to conductor 170 to form power input means for coil element 30, whereas metallic shield 166 and 167 in cables 150 and 152 are joined to conductor 172 to form the return power line and complete the circuit from input conductor 170 through induction coil element 30. A suitable dielectric material such as heat-resistant plastic may be molded or otherwise formed into an outer covering or plug member 187 as shown in FIGURES 12–14, with dielectric face plate 188 secured at the end thereof for bearing contact with surface 190 at the lower end of coil element 30 shown, for example, in FIGURE 8.

It will be understood that when standard coaxial cable is used without a shield, the cable inner conductor may be connected to one tubular conductor such as 170, while the cable outer conductor may be connected to the other tubular conductor 172 to complete the circuit between fixture 10 and the brazing power source. In using plain coaxial cable such as described in the foregoing arrangement, the cross-sectional area of the cable inner conductor should be approximately equal to the cross-sectional area of the cable outer conductor.

A modification of the connection means shown by FIGURES 12–14 is shown by FIGURE 15 wherein conductors 170 and 172 terminate in female coupling means 192 and 194 instead of the male coupling configuration shown by FIGURES 12 and 14. Thus, the connection means of FIGURE 15 is adapted for use with coil elements 30 having plug means of the general type shown at the distal end of conductors 170 and 172 in FIGURES 12 and 14. Except for the stated difference, it will be understood that the internal structure of FIGURE 15 may be identical to that described in connection with FIGURES 12–14.

Figure 16:
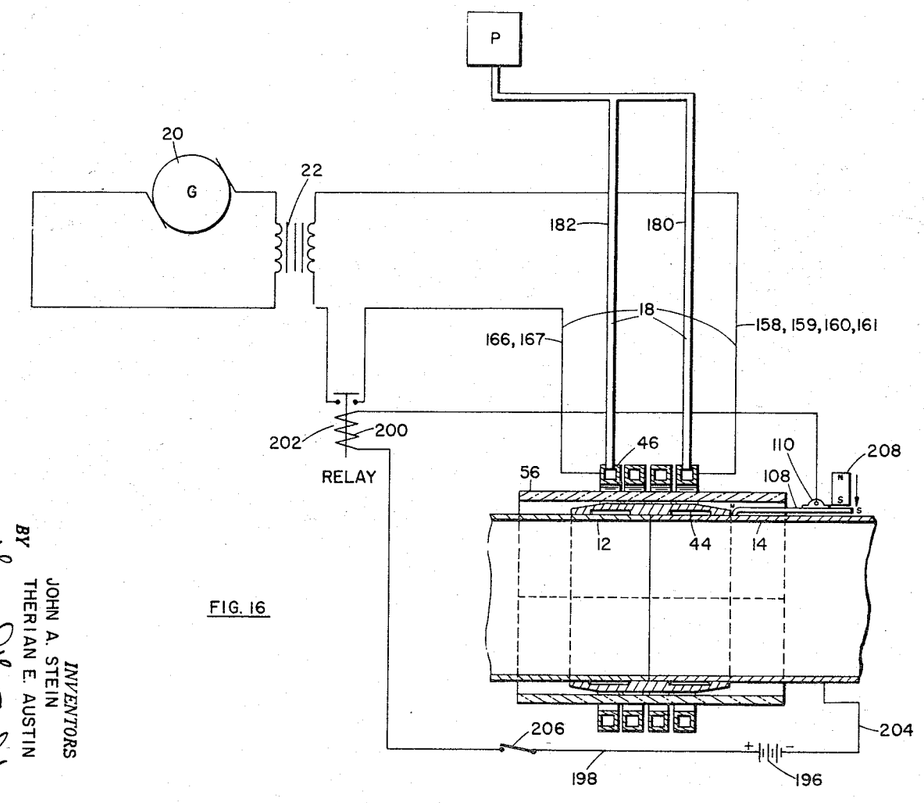
FIGURE 16 is a schematic view showing the general circuitry and the relationship between the electrical and the pneumatic portions of the brazing system of FIGURE 1.

As seen from the schematic showing of FIGURE 16, magnetic means in the form of lever 108 discussed above in connection with FIGURE 6, for example, is electrically related to the circuit by means of which power is applied to coils 46 in order to control the amount and duration of brazing heat. Thus, lever 108 is pivotally mounted at 110 whereby the left-end thereof as seen in FIGURE 16 contacts conduit section 14 due to magnetic force between the application of brazing heat. Secondary power means of low voltage, such as battery 196, is provided to supply current through connection means 198 to a coil 200 in a relay generally designated by reference numeral 202 and thence through lever 108. Contact of lever 108 with conduit section 14 causes completion of the electrical circuit through the stated conduit section by reason of connecting means 204 which electrically connect the conduit section with battery 196 to complete the switch circuit. It my also be seen from FIGURE 16 that the switch portion of relay 202 is included in the power circuit connections between transformer 22 and coils 46 whereby operation of the relay may either interrupt or complete the stated circuit, either to prevent or to permit the application of brazing heat.

Thus, it will be understood from the description of structure set forth above that closure of switch 206 in connection 198 at the start of the brazing operation will apply power from battery 196 through relay 202 causing the relay to complete the power circuit whereby power from generator 20 and transmitted through transformer 22 will cause induction coil 46 to apply brazing heat to sleeve or bushing 44. Application of heat in the manner stated will continue until the temperature of conduit section 44 reaches a value of temperature called the Curie point at which the material in conduit 14 loses its magnetic permeability and member 108 is no longer attracted to conduit section 14. When the stated change occurs, the magnetic force exerted by lever 108 on conduit 14 will no longer maintain lever 108 in contact with the conduit section if any slight force is applied to the lever in a direction causing separation of the lever from the conduit surface. Force of the type described may be applied either by a spring or by magnetic means acting on the end of lever 108 opposite from the end which contacts conduit section 14. Thus, for example, in FIGURE 16 a small magnet 208 is operatively positioned near the end of lever 108 whereby repelling magnetic force applied to the lever tends to cause rotation of the lever about pivot 110 in a clockwise direction. When the temperature of conduit section 14 reaches the Curie point whereby contact of lever 108 with the conduit surface is no longer maintained by magnetic attraction therewith, the repelling force of magnet 208 acting upon lever 108 causes slight but sufficient movement of the lever whereby electrical contact between lever 108 and conduit 14 is broken. When the stated interruption of the circuit from battery 196 occurs, power from the battery is no longer applied through relay 202 and the relay automatically opens to interrupt the circuit between transformer 22 and induction coil 46, thus causing termination of power to the induction coil with consequent termination of the application of brazing heat.

Operation

Although the apparatus disclosed herein may be used for automatic application of heat to a variety of diverse materials, workpieces, and for different purposes, its operation need not in any case differ materially from that described below for the sake of illustration. Prior to use of the apparatus for brazing, a suitable brazing alloy is prepositioned under sleeve 44, and conduit sections 12 and 14 are aligned, with sleeve 44 over the abutting ends thereof.

Figure 5:
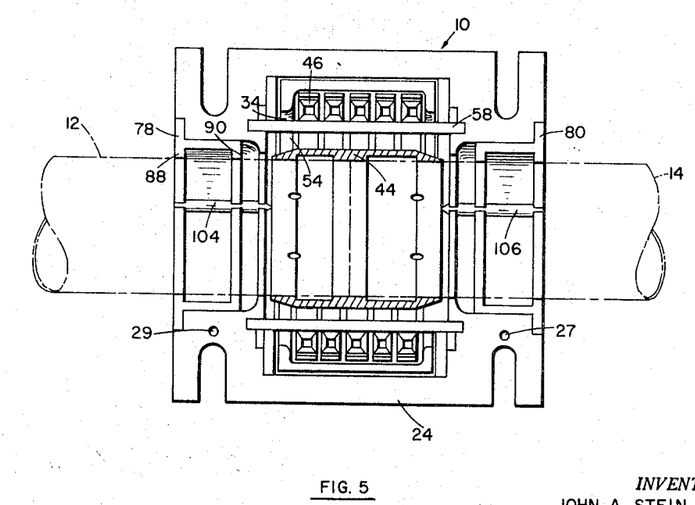
FIGURE 5 is a plan view taken through the plane of separation between the two halves of the brazing fixture shown by FIGURES 1, 2 and 4, looking downwardly upon the lower half thereof.

With the workpiece components properly arranged as required, housing portion 24 of fixture 10 is positioned proximate the stated components as shown, for example, in FIGURES 2, 4 and 5. Quick and precise positioning of fixture 10 may be achieved by use of indexing means such as etched or inked mark 11 on conduit section 12 shown in FIGURE 2. Mark 11 is applied before installing fixture 10, and is located a measured distance from plane of abutment 42 whereby alignment of bearing member 78 with mark 11 will position fixture 10 so that pins 104 and 106 mounted thereon will center sleeve 44 precisely over the stated plane. Thus, even though the precise location of plane of abutment 49 is not visible, accurate alignment of all workpiece components and of fixture 10 in operative relationship therewith results from the teachings disclosed herein.

After positioning of annular housing portion 24 in the manner set forth above, annular housing portion 26 of fixture 10 containing coil element upper portion 32 is indicated in FIGURE 6, for example, is positioned in operative relationship with the assembled workpiece components by placing housing portion 26 in mating contact with portion 24, insuring that indexing stakes 23 and 25 enter holes 27 and 29 discussed above in connection with FIGURE 6. Due to the stated indexing means between housing portions 24 and 26, it may be seen that the position of annular housing portion 26 depends upon the position of portion 24. The operative relationship of annular housing portions 24 and 26 described above is continuously maintained during the brazing operation by the action of studs 31, 33, 35 and 37 which extend between the stated housing portions and clamp the same together by means of holding unts in the conventional and well known manner for such holding means.

After installing the several parts of fixture 10 as discussed above, lower portion 34 of coil element 30 may be assembled therewith by installing portion 34 in the space or opening 210 provided on the lower or bottom surface of annular housing portion 24 as shown in FIGURE 6. Upon proper seating of portion 34 in operative relationship with upper coil portion 32, plug members 51 in each lower ring portion 49 will penetrate the hollow centers of each upper ring portion 47 to complete rings 46 as discussed above in connection with FIGURE 9. Simultaneously, blade electrodes 55 and 57 attached to upper and lower ring portions 47 and 49, respectively, will engage each other by a wiping action during assembly of the two stated ring portions with each other. Following assembly of the components of fixture 10 as described above, alignment of coil element 30 within annular housing portions 24 and 26 may be accomplished by adjustment screws 38 and 40 so that the position of induction heating rings 46 relative to brazing sleeve 44 will result in concentration of brazing heat at the proper location. When the stated alignment is complete, spring clamp means 36 on either side of fixture 24 may be pressed into engagement on either side of lower portion 34 of coil element 30 to maintain the desired position of adjustment and retain the coil element in operative relationship with the other components of fixture 10 as shown by FIGURE 2, for example.

Upon completion of the assembly procedures applicable to fixture 10 as described above, inert gas supply lines 96 and 98 may be connected to the fixture on either side thereof as shown by FIGURES 2 and 4, for example, and electrical connection between power source 20, transformer 22, and fixture 10 may be accomplished as required and discussed above in connection with FIGURES 12–15, inclusive. Electrical connection is also made with pivotally movable member 108 to establish a low voltage circuit as shown schematically in FIGURE 16 to provide automatic temperature control means as referred to above.

Before application of brazing heat to the assembled workpiece components, a flow of suitable inert gas such as argon is established through conduit means 96 and 98 whereby oxidation and other adverse effects on the workpiece components which might otherwise occur in the heated state are avoided. Thus, for example, argon gas may be introduced through conduits 96 and passage 100 thereby showing chamber 54 and exiting therefrom through passage 102 and conduit 98. Flow of the inerting agent may be continuously maintained in the stated manner throughout the brazing operation. Since the inerting agent may be at a relatively low temperature, the stated purging procedure will afford the additional advantage of cooling conduit sections 12 and 14 in the areas thereof adjacent each end of sleeve 44, thus helping to avoid annealing of the material in the stated area which otherwise might occur at the high temperatures associated with brazing in most materials.

With the apparatus connected as necessary to accomplish the brazing operation, switch 206 may be closed to actuate relay 202 whereby radio frequency current flowing through coils 46 produces a high frequency magnetic field around the assembled workpiece components. It is this magnetic field oscillating at radio frequency that causes heating of the workpiece components by an action known as eddy current and hysteresis. In brazing workpiece components fabricated from 350 stainless steel together with standard silver-nickel brazing alloy, induction heating near the plane of abutment 42 may produce a temperature close to 2000° F., whereas the temperature of conduit sections 12 and 14 in the area adjacent each end of sleeve 44 will be much less, such as 1400–1500° F. Thus, when the temperature at the point of contact between pivotally movable member 108 and conduit section 12 reaches a value approximately 1350° F., magnetic attraction between the stated member and conduit section is lost due to the effect referred to above as the Curie point. When the stated loss of magnetic attraction occurs, the force of spring 114 or of magnet 208 acting upon movable member 108 causes separating movement of the same whereby electrical contact is broken, causing interruption of the power circuit by operation of relay 202, terminating the brazing cycle as discussed above.

From the description of structure and its operation as set forth above and shown in the drawings, it may be seen that the invention disclosed herein provides novel means for applying heat such as required for brazing operations in relatively remote and inaccessible areas. Fixture 10 is of extremely efficient and compact nature, and is readily adaptable for brazing a variety of different workpiece shapes and sizes, such as elbows, T's, crosses, reducers and many different kinds of bulkhead fittings. The feature which permits separation of fixture 10 along a common plane and assembly thereof about an immovable and inaccessible workpiece permit great versatility in use of the fixture. Moreover, the purging means including arrangement of passages 100 and 102 and their relationship with chamber 54 provides new and useful results in producing a brazed joint of great strength and reliability, particularly by avoiding annealing effects at either end of the brazing sleeve.

The ease of installation afforded by the various features described above makes possible the use of fixture 10 for in-place brazing of various fluid lines and conduits, thus avoiding the necessity for disassembling and removing portions of structure from an aircraft, missile or other vehicle as required for bench brazing in a workshop. Thus, heat is concentrated at the precise location where brazing is accomplished, and is contained within a small local area whereby other lines or structural elements situated close to the brazing area are not affected by brazing heat. Moreover, the structural relationship between the mating portions of fixture 10 permitting separation of the same avoid the dangers of air leakage contacting the workpiece components and oxidizing the same, or electrical arcing across coil coupling 39 in rings 46. In addition, the relatively lightweight construction and arrangement of component parts in fixture 10 results in rapid dissipation of brazing heat whereby the continued application of residual heat following the brazing operation does not produce widespread annealing of workpiece components, or consequent weakening of the brazed joint.

In addition to the novel features of fixture 10 which adapt the same for in-place brazing in relatively crowded structural areas, the cooperative relationship between cable 18 and fixture 10 permits use of the fixture in the stated manner. Thus, cable 18 is highly flexible, small in cross-sectional area and electrically very efficient whereby the cable delivers sufficient power to fixture 10 at distances fifty feet or more away from the power source.

The problems normally associated with use of coaxial cable as a radio frequency conductor in brazing operations, such as the high percent of power loss in such cables and consequent longer heating cycle and greater area of annealment in the brazed workpieces, are avoided by the various features of construction for cable 18 and the coating provisions associated with coil element 30 in the instant case. Since the stated cooling provisions involve air, the larger diameter coaxial cable which would be necessary to provide the cooling task for recirculating water, for example, and consequent decrease in cable flexibility, are avoided by this invention. Due to the foregoing cable characteristics, and the relationship between cable 18 and fixture 10 as described above, in-place brazing to produce conduit connections and the like having improved strength and structural reliability at locations remote from the brazing power source are achieved by the structure disclosed herein. In addition, automatic control of the brazing cycle whereby the application of brazing heat is accurately limited so that workpiece components are heated to the liquidus temperature of the brazing alloy, and the further application of brazing heat is terminated, accomplishes further improvement in the characteristics of the brazed joint or connection produced by the structure disclosed herein.

It is of further significance in the inventive concept disclosed herein that coupling means 39 shown, for example, in FIGURE 9, and discussed above permits a suction or jet-pump effect at the connection of ring portions 47 and 49 whereby the region of contact between wall portions 58 and 60 externally thereof is continually evacuated during flow of cooling fluid through rings 46. This feature may be enhanced by use of the alternative embodiment shown in FIGURE 8a, wherein cooling fluid supply lines 48 and 50 communicate with a common manifold or chamber 212. Chamber 212 communicates in turn with each of rings 46 through passages 214, whereby cooling fluid flows through the stated rings, exiting therefrom at apertures 52 as shown in FIGURE 8. During flow of cooling fluid through coupling means 39, it may be seen from FIGURE 9, for example, that upward flow through plug member 51 will produce suction of air through any spaces or gaps occurring between ring portion 47 and the upper half of plug 51 in the event that the contacting surfaces thereof do not fit snugly. When the manifold arrangement of FIGURE 8a is employed, plug members 51 may purposefully be sized to fit somewhat loosely within ring portions 47, whereby the tendency for air or other cooling fluid under pressure to leak from coupling means 39 and to enter chamber 54 between the contacting surfaces of wall portions 58 and 60 is avoided.

While the particular details set forth above and in the drawings are fully capable of attaining the objects and providing the advantages herein stated, the structure and method thus disclosed are merely illustrative and could be varied or modified to produce the same results without departing from the scope of the inventive concept as defined in the appended claims.

We claim:
1. Induction heating means for causing heat in a localized area of a specimen, said means including a generally cylindrical induction coil for concentrically surrounding said specimen and comprising hollow conductive tubing through which cooling air, admitted into a plurality of locations intermediate the ends of said tubing, passes during the application of said heat, the walls of said tubing constituting a portion of an electrical circuit through which electrical power supplied to said coil results in said heat, and exit means comprising at least one aperture in said tubing intermediate the ends thereof for venting said cooling air to surrounding atmosphere.

2. Induction heating means for causing heat in a localized area of a specimen, said means including:
an induction coil comprising hollow conductive tubing through which cooling air, admitted into the ends of said tubing, passes during the application of said heat, the walls of said tubing constituting a portion of an electrical circuit through which electrical power supplied through said coil results in said heat, exit means comprising at least one aperture in said tubing intermediate the ends thereof for venting said cooling air to surrounding atmosphere, said tubing comprising at least two separable mating portions adapted to be operatively joined together to form said coil, each of said tubing portions including coupling means for providing a continuous path for said air and said current across said coupling means when said tubing portions are in mating relationship with each other, said coupling means including jet-pump suction means tending to draw surrounding atmosphere into said tubing.

3. The structure set forth in claim 2 wherein said suction means includes a bushing coaxially positioned and secured in each end of one of said two tubing portions, said bushings adapted to enter the hollow ends of the other of said two tubing portions to provide a substantially continuous path of flow for said cooling fluid through said coil when said two tubing portions are in operative relationship with each other.

4. The structure set forth in claim 3 above wherein said coupling means further include a blade electrode on each of said two tubing portions, said electrodes adapted to scrape their contacting surfaces together during assembly and disassembly of said tubing portions into or out of operative relationship, and to contact each other during said operative relationship.

5. The structure set forth in claim 2 above including in addition thereto, a dielectric mass of material having a low coefficient of thermal conductivity, in which said tubing is embedded.

6. Induction heating means comprising a generally cylindrical conductor formed of two separable semi-cylindrical portions, said conductor comprising a plurality of separate rings, said rings each comprising two semi-circular sections of hollow tubing joined together at their abutting ends, cooling passage means communicating with said conductor for supplying a flow of cooling fluid through said hollow tubing sections, and coupling means connecting said tubing sections at their said abutting ends whereby a continuous path of flow for said cooling fluid occurs from one of said tubing sections to the other of said tubing sections, forming each of said separate rings, said cooling passage means comprising manifold means for simultaneously flowing said cooling fluid into each of said semi-circular ring sections comprising one of said semi-cylindrical portions of said conductor.

7. The structure set forth in claim 6 above including in addition thereto, exit means comprising at least one aperture in said conductor for venting said flow of cooling fluid to surrounding atmosphere.

8. The structure set forth in claim 6 above wherein said coupling means includes a hollow bushing mounted coaxially within one of said two tubing sections and protruding therefrom at the end thereof abutting the other of said two tubing sections, whereby said bushing enters the abutting end of said other of said two tubing sections to provide a continuous flow path for said cooling fluid flow from said one tubing section to said other tubing section.

9. The structure set forth in claim 8 above in which said coupling means further includes a blade electrode secured to each of said two tubing sections and adapted to scrape their contacting surfaces together and to contact each other forcibly and continuously during abutting engagement of said two tubing sections to provide continuous electrical contact between said two sections.

10. In an induction heating element, an interiorally hollow tubular conductor of helical form comprising a generally cylindrical coil severed on a plane of separation containing the coil longitudinal axis whereby said conductor is divided into a plurality of arcuate segments, each one of which is adapted to abut another segment at the ends thereof with said hollow interior of said segments in substantial alignment at said abutting ends when said coil is assembled in operative relationship, conduit means connected to each end of said coil for flowing air through said hollow interior of said tubular conductor, and exit means comprising at least one aperture in said tubular conductor for permitting escape of said air from within said tubular conductor, into surrounding atmosphere.

11. Induction heating means comprising an arcuate conductor formed of two separable sections of hollow tubing, joined together at their abutting ends, said tubing being square in cross-section, cooling passage means communicating with said conductor for supplying a flow of cooling fluid through said hollow tubing sections, and coupling means connecting said tubing sections at their said abutting ends whereby a continuous path of flow for said cooling fluid occurs from one of said tubing sections to the other of said tubing sections when assembled in operative relationship, said coupling means including jet-pump suction means for inducing surrounding atmosphere into said tubing section.

12. Induction heating means for causing heat in a localized area of a specimen, said means including housing means for supporting an induction heating element in stationary operative relationship with said area, an induction heating element adjustably supported within said housing means and movable with respect thereto, and holding means for holding said induction heating element in continuous adjustment with respect to said housing means.

13. An induction coil for causing heat in a localized area of a specimen, said coil comprising hollow conductive tubing through which cooling fluid admitted into the ends of said tubing passes during the application of said heat, the walls of said tubing constituting a portion of an electrical circuit through which electrical power supplied to said coil results in said heat, exit means comprising at least one aperture in said tubing intermediate the ends thereof for venting said cooling fluid to surrounding atmosphere, said tubing comprising at least two separable mating portions adapted to be operatively joined together to form said coil, each of said tubing portions including coupling means for providing a continuous path for said cooling fluid and said current through said coil when said tubing portions are in mating relationship with each other, and manifold means communicating with the said ends of said tubing whereby said cooling fluid is simultaneously admitted into said ends of said tubing and in at least one location intermediate said ends.

14. In a split air-cooled induction heating coil formed by hollow electrically conductive tubing of helical configuration, air flow coupling means between the connecting ends of said tubing at the plane of separation of said split coil, said air flow coupling means consisting of a bushing secured within one of said ends and adapted to fit slidably within another tubing end connected to said one end, whereby flow of cooling air through said one tubing end passes through said bushing.

15. In an induction heating element,
 a tubular conductor of helical form comprising a generally cylindrical coil severed on a plane of separation containing the coil longitudinal axis whereby said conductor is divided into a plurality of arcuate segments, each one of which is adapted to abut another segment at the ends thereof when said coil is assembled in operative relationship,
 conduit means connected to each end of said coil for flowing air through said tubular conductor,
 exit means comprising at least one aperture in said tubular conductor for permitting escape of said air from within said tubular conductor into surrounding atmosphere, and a mass of high temperature resistance material having heat insulating properties, said tubular conductor being mounted in said mass and supported thereby.

16. In a split air-cooled induction heating coil formed by hollow electrically conductive tubing of helical configuration;

air flow coupling means between the connecting ends of said tubing at the plane of separation of said split coil, said air flow coupling means consisting of a bushing secured within one of said ends and adapted to fit slidably within another tubing end connected to said one end, whereby flow of cooling air through said one tubing end passes through said bushing, said bushing being sized to fit relatively loosely within said other tubing end whereby a jet pump is formed by said coupling means.

17. The structure set forth in claim 16 above including in addition thereto, manifold means communicating with each individual turn of said helical coil whereby said flow of cooling fluid supplied through said manifold flows into each of said turns, and exit means comprising at least one aperture in each of said turns for venting said cooling fluid from said turns to surrounding atmosphere.

References Cited by the Examiner
UNITED STATES PATENTS

| | | | |
|---|---|---|---|
| 2,180,513 | 11/1939 | Fugill et al. | 219—10.79 |
| 2,783,351 | 2/1957 | Conkling et al. | 219—10.79 |
| 3,076,884 | 2/1963 | Crawford | 219—10.79 |
| 3,110,793 | 11/1963 | Worthington | 219—9.5 |
| 3,182,170 | 5/1965 | Rolfes | 219—10.79 |
| 3,219,786 | 11/1965 | Wenzel | 219—10.79 |

RICHARD M. WOOD, *Primary Examiner.*

ANTHONY BARTIS, *Examiner.*

L. H. BENDER, *Assistant Examiner.*